J. W. HUGHES.
APPARATUS FOR MANUFACTURING ARTIFICIAL STONE.
APPLICATION FILED OCT. 11, 1913.
1,100,374.
Patented June 16, 1914.
3 SHEETS—SHEET 3.
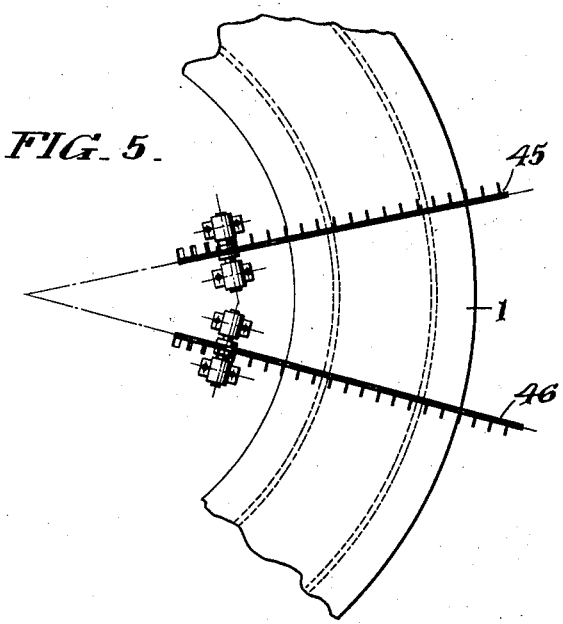
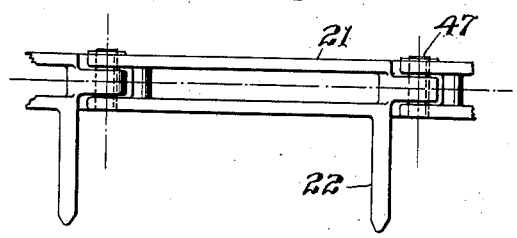
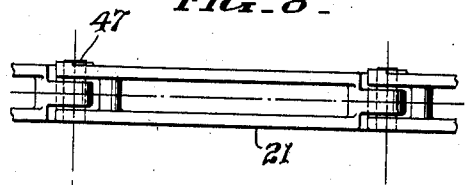
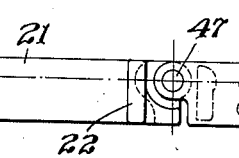
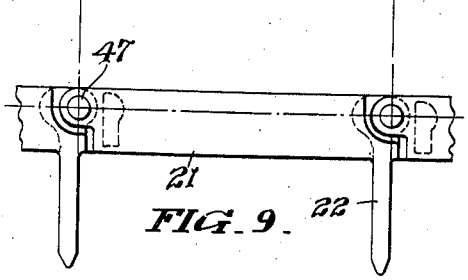
WITNESSES
Daniel Webster Jr.
E. W. Smith
INVENTOR
James W. Hughes
BY
ATTORNEY

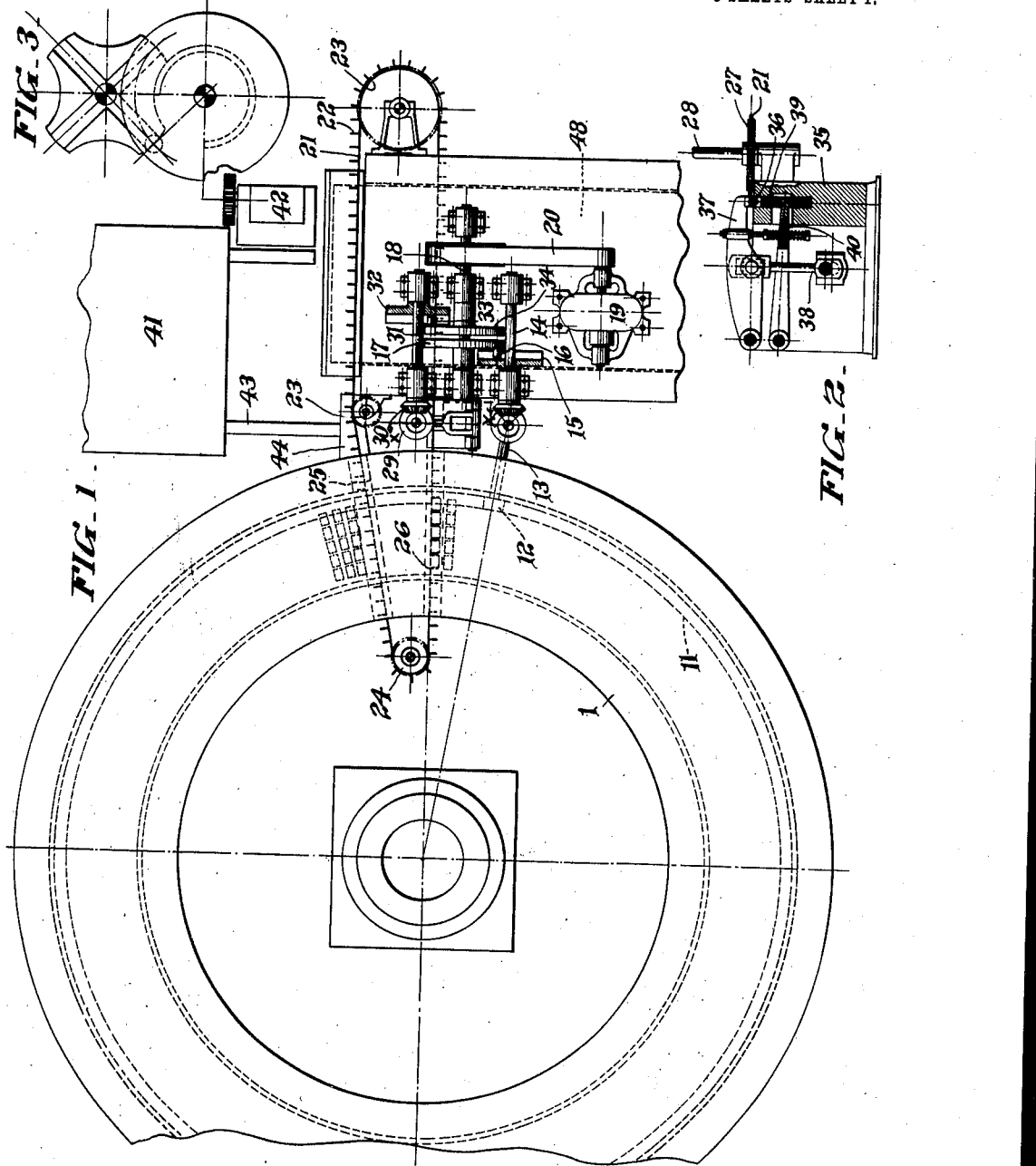

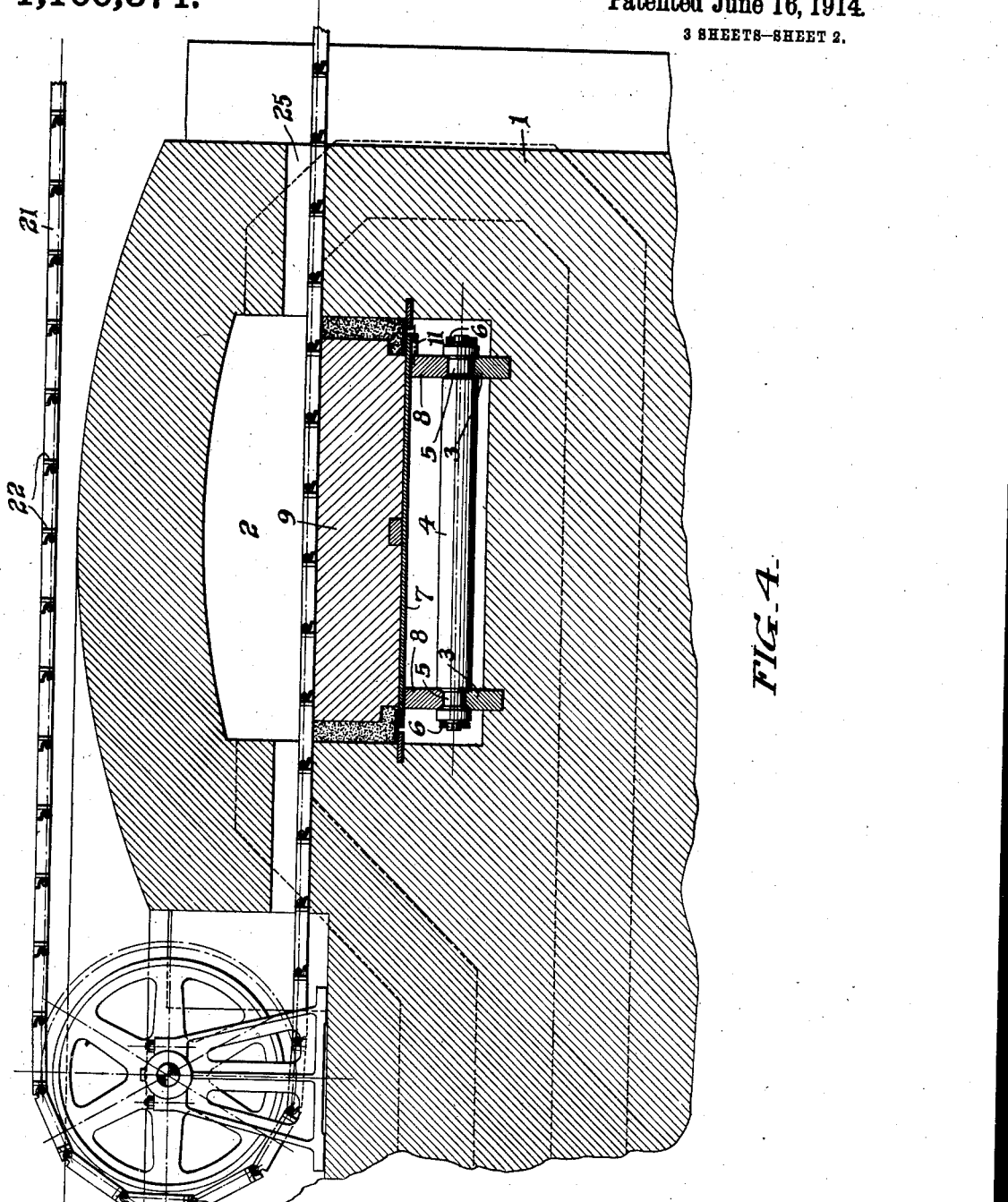

UNITED STATES PATENT OFFICE.

JAMES W. HUGHES, OF NARBERTH, PENNSYLVANIA, ASSIGNOR TO LUCY K. HUGHES, OF NARBERTH, PENNSYLVANIA.

APPARATUS FOR MANUFACTURING ARTIFICIAL STONE.

1,100,374. Specification of Letters Patent. Patented June 16, 1914.

Application filed October 11, 1913. Serial No. 794,538.

*To all whom it may concern:*

Be it known that I, JAMES W. HUGHES, citizen of the United States, and resident of Narberth, county of Montgomery, and State of Pennsylvania, have invented an Improvement in Apparatus for Manufacturing Artificial Stone, of which the following is a specification.

This invention relates to the art of brick and artificial stone making, and the object of the invention is to provide an apparatus for the making of artificial stone or like material, in which the prepared ingredients are molded in suitable form, then heated to a high temperature and finally cooled.

More particularly, my invention has for its main object the method and means for making delivery of the articles to a traveling hearth of a furnace, and a delivery of heated articles therefrom, whereby the process may be conducted in a substantially continuous manner and the efficiency of the apparatus be such that the operation is not affected or interfered with by the high temperature of the furnace.

In carrying my invention into practice, I provide a furnace having an annular hearth, which is intermittently moved through the heated zone of the furnace body and at intervals throughout its length I deposit thereon freshly molded articles, and remove therefrom highly heated articles which have been previously subjected to the high temperature zone of the furnace, said results being accomplished by transversely moving conveyer devices which extend across the width of any portion of the annular hearth so as to be alternately brought into the highly heated atmosphere adjacent to the hearth and to the cool outside atmosphere, the latter acting to reduce the temperature of the heated conveyer devices immediately after being heated in crossing the hearth and thereby prevented from being melted or injured.

My invention further consists in forming the preferred construction of the conveyer devices in the form of an endless chain structure having tangs or projections at intervals along its length for engaging and conveying the articles to be moved upon and from the hearth, portions of said chain structure extending beyond the sides of the hearth so as to be out of the heating influence thereof, one portion of said chain structure serving to convey the cooled articles on to the hearth while another portion thereof serves to remove the heated articles from the hearth.

The conveyer devices above referred to are preferably operated intermittently, though of course they may be otherwise controlled and the hearth while always moving in the same direction is also preferably subjected to intermittent movement so that the newly introduced articles may be carried out of the custody of the tangs of the conveyer devices by frictional contact with the moving hearth while at the same time the highly heated articles, having passed through the length of the furnace, are delivered into the custody of the tangs of said conveyer devices.

My invention also comprehends further details of construction which, together with the features above specified will be better understood by reference to the drawings, in which:—

Figure 1 represents a plan of an apparatus embodying my invention; Fig. 2 represents a section on line X—X of Fig. 1; Fig. 3 represents a detail of a mechanical movement employed; Fig. 4 represents a vertical section of a portion of the furnace showing a modified form of conveyer mechanism; Fig. 5 represents a plan of the modified form of conveyer shown in Fig. 4; Fig. 6 represents a plan of a portion of the modified type of conveyer chain; Fig. 7 represents a side elevation of the same; Fig. 8 represents a side elevation of the preferred form of conveyer; Fig. 9 represents a plan of the portion shown in Fig. 8.

Referring to the drawings, 1 designates the casing of a furnace which is provided with an annular channel 2 which forms the oven or baking chamber through which the articles to be baked are suitably conveyed it being understood that this chamber is heated in any well known manner, and the burners or like heat-supplying means form no part of the present invention.

3 designates a pair of track rails suitably mounted within the chamber 2 and secured to the floor thereof in any suitable manner, while at suitable intervals throughout the length of the channel 2 there are bearing rolls 4, having suitable tapered recesses 5 to conform to the shape of the bearing surface of the rails 3. The aforesaid rolls 4 are secured together at each end by suitable links 6 whereby an endless chain is produced having substantially the function of a roller bearing.

7 designates the bottom hearth plate to which suitable depending rails 8 are secured, the said rails being respectively curved in a similar manner to the rails 3, and each adapted to seat in a groove 5 of the rolls 4. This construction provides an inner and an outer fixed supporting rail, an intermediate series of rolls linked together and adapted to move with respect to the adjacent rails while supporting thereon the inner and outer rails 8 which depend from the hearth-plate 7. Upon the plate 7 there is mounted a table 9, preferably formed of fire-brick or like heat-resisting material, while at either side thereof the space between the said table and the walls of the channel 2 is filled with suitable packing 10 to prevent the escape of heat units.

As here shown the rotatable part embodying the members 7 and 9 is driven through the medium of a rack 11 fixed at a suitable point to the hearth, and of course extending throughout the length thereof. In mesh with this rack 11 there is a pinion 12 carried by a spindle 13, the latter passing through the casing 1, and being driven through suitable gearing from the shaft 14. The shaft 14 in the present instance is actuated by a face gear mechanism comprising the slotted disk 15 carried by the shaft 14 and pin 16 of the continuously rotating member 17, this latter being mounted upon the main shaft 18, which is driven from any suitable source of power such as the motor 19 and belt drive 20.

21 designates an endless conveyer chain formed of a plurality of links pivoted together and each having in the preferred form of my invention a laterally disposed tang 22. In the operation of the conveyer these tangs are so positioned with respect to the hearth table 9 that articles carried by the said table are delivered between adjacent tangs on one side of the conveyer, while articles contained within the tang on the opposite side of the conveyer are removed from the conveyer by the same movement of the hearth.

In Fig. 1 I have shown the preferred construction wherein the conveyer 21 is disposed in a substantially horizontal plane and passes around suitable idle sprockets 23 and 24, the latter being located at the opposite side of the path of the hearth table from the remaining sprocket so that a portion of the conveyer is always exposed to the cool exterior air. The conveyer 21 passes through suitable openings 25 and 26 extending transversely through the casing 1, and are so arranged with respect to the movable hearth table that the conveyer passes through the walls of the furnace or oven substantially flush with the receiving surface of the hearth table 9, so that articles carried by the conveyer are either deposited upon the hearth table or removed therefrom. The conveyer 21 is preferably intermittently actuated by means of a step-by-step mechanism comprising the sprocket 27, shaft 28 and beveled gear 29, this latter being in mesh with a similar gear 30 on a counter-shaft 31. Motion is imparted to the counter-shaft 31 through a slotted member 32 fixed to the shaft 31 and engaged by a pin 33 of a disk 34 fixed to the shaft 18, and it will of course be understood that both of these mechanisms controlling the intermittent actuation of the hearth 9 and conveyer 21 are so timed and related as to be actuated at the proper time in the cycle of operation. 35 designates the delivery table located adjacent the discharge point from the rotary furnace and the same is here provided at a suitable point with a mold opening 36 above which the heated articles are passed by the conveyer 21 and there subjected to a pressing or final molding by means of the pivoted presser arm 37 which is raised and lowered by suitable crank movement 38, driven from any suitable source and adapted to coact with the mold pad 39 controlled by the spring pressed arm 40. 41 designates diagrammatically a drier into which the material is delivered by the molding mechanism 42 and after a preliminary drying the aforesaid molded material is passed along the ways 43 to the table 44 where it is picked up by the conveyer 21 in its movement into the machine.

In Figs. 4 and 5 I have shown a modified form of apparatus wherein the conveyer mechanism 21 is arranged substantially in a vertical plane and it is therefore necessary to provide a plurality of these conveyer chains as shown in Fig. 5, one of which, as 45, serves to deliver the articles to the furnace, while the other, as 46, serves to discharge the highly heated materials from the furnace.

In Figs. 6 to 9 I have shown details of portions of each form of conveyer chain, and it will readily be understood that in the preferred form the tangs are disposed at right angles to the pivot pins 47, while in the modified form the tangs are substantially parallel to the said pins 47, so that the respective conveyer chains will follow the proper path of movement and position the tangs in the desired manner.

The operation of the machine is as follows: The pre-heated molded material is delivered from the drying chamber 41 to the table 44 where the said articles are successively placed between adjacent prongs 22 of the conveyer 21, and as the conveyer 21 is started by the intermittent or step-by-step mechanism, a plurality of the articles or units are carried forward through the opening 25 into the chamber 2, where they pass along the surface of the rotatable hearth 9, and when the number of units upon the hearth approximates the width capacity of said hearth, the conveyer is automatically brought to rest. Simultaneously with this stopping of the conveyer the rotatable hearth is given a partial rotation and the frictional engagement of the hearth with the row of units causes the said units to be removed from the prongs of the conveyer 21, and it is then free to introduce another row of units into the furnace. When the furnace has been substantially filled by the successive rows of units, the row of units first placed in the furnace has been brought into close proximity to the discharge side of the conveyer 21, and is alined with the opening 26 so that from this point the operation of the furnace becomes substantially a continuous one, since while one row of units is entering through the opening 25 and being positioned upon the hearth 9, a second row of highly heated units takes a position upon the opposite side of the conveyer 21 ready to be discharged through the opening 26. As the units in their highly heated state are drawn out of the furnace, they pass successively through the press mechanism 37 and are there pressed into final shape while still in the conveyer 21, and are then deposited upon a conveyer belt 48 which forms a part of the finishing leer mechanism.

I have described my improvements on the more approved construction, as that is preferred by me in practice, but I do not restrict or limit myself to the details, as they may be changed or modified in many ways without departing from the spirit of the movements; for example, instead of the hearth being made in annular form it may be made in any other way so long as it is made to travel under the transverse conveyer devices, and likewise, the conveyer devices may be made in various forms so long as they act to move the articles transversely upon and from the traveling hearth and portions thereof are moved to a cool atmosphere after passing into close relation with the heated hearth, all of which will be understood by those skilled in the art.

It will now be apparent that I have devised an apparatus for making delivery to and discharge from a furnace in which the conveying means for conveying the articles into and from the furnace extends entirely across the zone of high temperature in the furnace and into the cooler atmosphere on each side of the furnace, whereby during its movement it passes from a zone of low temperature into a zone of high temperature within the furnace, and then again into a zone of low temperature whereby it is cooled, and thence again into the zone of high temperature and in the act of transferring the articles therefrom said means passes into a zone of cooler temperature, whereby said conveying means is not subjected continuously to the destructive heat of the zone of high temperature of the furnace.

The construction whereby the conveyer devices are moved alternately into a heating and cooling atmosphere, is an important feature of this invention irrespective of the details of the construction, and I therefore do not restrict myself to the details shown.

Having thus described my invention, I claim and desire to protect by Letters Patent of the United States:—

1. In an apparatus of the character stated, a furnace having a traveling hearth, combined with an endless conveyer having parts arranged to engage articles to be moved into and from the hearth in normal operation thereof, said conveyer extending transversely across the surface of the hearth and having one portion operating to feed articles to be heated onto the hearth and another portion simultaneously delivering heated articles from the hearth, and means for imparting motion to the conveyer.

2. In an apparatus of the character stated, a furnace having a traveling hearth, combined with an endless conveyer having parts arranged to engage articles to be moved into and from the hearth in normal operation thereof, said conveyer extending transversely across the surface of the hearth and having one portion operating to feed articles to be heated onto the hearth and another portion simultaneously delivering heated articles from the hearth, supporting means for the articles arranged below the conveyer where it moves to and from the hearth, and means for imparting motion to the conveyer.

3. In an apparatus of the character stated, a furnace having a traveling hearth, combined with means for delivering articles to and from the hearth in normal operation thereof, consisting of guides arranged on opposite sides of the hearth surface, and a horizontally arranged endless conveyer of chain-like structure extending about said guides and having parts to engage and push the articles onto and from the hearth, said conveyer extending across the heated hearth and into cooler atmospheric zones at each side thereof, whereby the conveyer portions may have opportunity to cool after passing over the heated hearth, and means for causing the conveyer to be moved.

4. In an apparatus of the character stated, a furnace having a traveling hearth, combined with means for delivering articles to and from the hearth in normal operation thereof, consisting of guides arranged on opposite sides of the hearth surface, and a horizontally arranged endless conveyer of chain-like structure extending about said guides and having parts to engage and push the articles onto and from the hearth, said conveyer extending across the heated hearth and into cooler atmospheric zones at each side thereof, whereby the conveyer portions may have opportunity to cool after passing over the heated hearth, stationary guide surfaces extending to the side of the hearth for supporting the articles while being pushed by the conveyer onto and from the hearth, and means for causing the conveyer to be moved.

5. In an apparatus of the character stated, a furnace having a traveling hearth, combined with means for delivering articles to and from the hearth in normal operation thereof, consisting of guides arranged on opposite sides of the hearth surface, and a horizontally arranged endless conveyer of chain-like structure extending about said guides and having parts to engage and push the articles onto and from the hearth, said conveyer extending across the heated hearth and into cooler atmospheric zones at each side thereof, whereby the conveyer portions may have opportunity to cool after passing over the heated hearth, means for causing the conveyer to be moved, and means for intermittently moving the conveyer whereby it is momentarily held at substantial rest during the removal of articles from its custody and delivery of heated articles into its custody by the traveling hearth.

6. In an apparatus of the character stated, a furnace having a traveling hearth, combined with an endless conveyer having parts arranged to engage articles to be moved into and from the hearth in normal operation thereof, said conveyer extending transversely across the surface of the hearth and having one portion operating to feed articles to be heated onto the hearth and another portion simultaneously delivering heated articles from the hearth, means for imparting motion to the conveyer, and means for intermittently moving the conveyer whereby it is momentarily held at substantial rest during the removal of articles from its custody and delivery of heated articles into its custody by the traveling hearth.

7. In an apparatus of the character stated, the combination of a furnace having a traveling hearth, a transversely arranged conveyer chain extending across the hearth and to a distance to one side of it so as to be out of the zone of high temperature, a support arranged under the conveyer for supporting the articles to be fed into the furnace while being moved by the conveyer, and means for intermittently moving the conveyer whereby it is momentarily held at substantial rest during the removal of articles from its custody and delivery of heated articles into its custody by the traveling hearth.

In testimony of which invention, I hereunto set my hand.

JAMES W. HUGHES.

Witnesses:
E. W. SMITH,
C. E. KLEINFELDER.